United States Patent
Döbele

(10) Patent No.: US 7,052,436 B2
(45) Date of Patent: May 30, 2006

(54) METHOD FOR TRIGGERING AN UPSHIFT DURING KICK-DOWN CONDITIONS

(75) Inventor: Bernd Döbele, Salem (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 36 days.

(21) Appl. No.: 10/490,692

(22) PCT Filed: Oct. 16, 2002

(86) PCT No.: PCT/EP02/11537

§ 371 (c)(1),
(2), (4) Date: Mar. 24, 2004

(87) PCT Pub. No.: WO03/036136

PCT Pub. Date: May 1, 2003

(65) Prior Publication Data

US 2004/0248697 A1    Dec. 9, 2004

(30) Foreign Application Priority Data

Oct. 20, 2001   (DE) ................................. 101 51 909

(51) Int. Cl.
F16H 59/20 (2006.01)
F16H 61/26 (2006.01)
(52) U.S. Cl. ...................... 477/141; 477/131; 477/136; 701/53
(58) Field of Classification Search ................ 477/133, 477/136, 141; 701/53, 55, 56
See application file for complete search history.

(56) References Cited

U.S. PATENT DOCUMENTS

| 3,876,028 A | * | 4/1975 | Asano et al. | 180/338 |
| 4,253,348 A | * | 3/1981 | Will et al. | 477/125 |
| 4,254,671 A | | 3/1981 | Sauer et al. | 74/866 |
| 4,473,882 A | * | 9/1984 | Suzuki et al. | 701/54 |
| 4,501,171 A | * | 2/1985 | Muller et al. | 477/139 |
| 5,157,991 A | | 10/1992 | Sumimoto | 74/866 |
| 2003/0065434 A1 | | 4/2003 | Henneken et al. | 701/55 |

FOREIGN PATENT DOCUMENTS

| DE | 27 09 235 | 9/1978 |
| DE | 35 13 778 C2 | 4/1995 |
| DE | 199 61 979 A1 | 8/2001 |
| WO | 00/63591 | 10/2000 |

* cited by examiner

Primary Examiner—Tisha Lewis
(74) Attorney, Agent, or Firm—Davis & Bujold, P.L.L.C.

(57) ABSTRACT

A motor vehicle for controlling an automatic gearshift stepped variable speed transmission that can be driven by a drive engine, in which, depending on an accelerator pedal position and an engine speed, upshifts or downshifts between the gear steps are triggered automatically and in which a kick-down switch is present. In a first speed range below a first boundary speed ($n_1$) actuation of the kick-down switch triggers a downshift. For one or more upper gear steps in a second engine speed range above a second boundary speed ($n\_KD\_Schw$), even at high loads, no downshifts is triggered and an upshift is only triggered by actuation of the kick-down switch.

9 Claims, 2 Drawing Sheets ly, then an upshift to the next gear step up or to the top gear
METHOD FOR TRIGGERING AN UPSHIFT DURING KICK-DOWN CONDITIONS This application is a national stage completion of PCT/EP02/11537 filed Oct. 16, 2002 which claims priority from German Application Serial No. 101 51 909.5 filed Oct. 20, 2001.

FIELD OF THE INVENTION

The invention concerns a method for controlling in a motor vehicle an automatic gearshift stepped variable speed transmission with several gear steps, that is driven by a drive engine.

BACKGROUND OF THE INVENTION

Most vehicles with automatic stepped variable speed transmissions, change-under-load automatic transmissions or automated shift transmissions are equipped with a so-termed kick-down switch. As a rule the actuation of the kick-down switch is interpreted to mean that the maximum traction force is demanded. Starting from a driving condition in which the kick-down switch is actuated, if a downshift is permitted because of the engine speeds anticipated, this is carried out.

To actuate the kick-down switch, as a rule the driver has to overcome some more resistance even when the accelerator pedal is almost fully depressed, so that the driver obtains feedback via this actuation force that further depression of the accelerator pedal is needed to trigger the kick-down program.

Compared with vehicles without a kick-down switch, the respective driving condition can be differentiated essentially more reliably and downshifts can be deliberately triggered or suppressed by the driver, only by corresponding actuation of the accelerator pedal.

In the case of heavy goods vehicles, particularly in the range of the maximum permitted speed on roads, namely 60 km/h, it is virtually impossible to design a gear shift program "optimally". The requirements for minimal fuel consumption and for sufficient excess traction to enable accelerations and/or driving up slight upward slopes are irreconcilably opposed, if at the same time too frequent gear shifting or cycling between gears is to be avoided. In other words, if the shifting program is designed for minimum fuel consumption, then an upshift to the next gear step up or to the top gear already takes place early. Then, as a result of the lower engine speed, in that gear step there is only little excess traction force, so that even when a small acceleration is called for, a downshift is again needed.

In practice, therefore, an actuator element is often provided which allows the driver to take action manually, so that he can suppress a gear shift or bring it about deliberately. This has the disadvantage that the fully automatic operating mode does not satisfactorily cover every driving situation.

Accordingly, the purpose of the present invention is to indicate a method for controlling an automatic gearshift stepped variable speed transmission, which allows a driver, especially in driving situations on an essentially level road, to influence the engaged gear deliberately without having to abandon the automatic operating mode.

SUMMARY OF THE INVENTION

The invention makes use of the knowledge that the kick-down switch usually has no function above a particular engine speed.

In the method according to the invention, when load indications are given by the accelerator pedal between 0 and 100% and without actuating the kick-down switch, the shift speeds are displaced upwards to such an extent that, for example, 90% of the nominal maximum speed of the drive engine is reached before a shift is triggered. In this operating condition, sufficient excess traction force is present to enable acceleration or even to ascend slopes up to a certain degree of steepness. If the engine or vehicle speed is high enough for a downshift not to occur due to actuation of the kick-down switch because of the expected high engine speeds, another function is assigned to the kick-down switch, namely the triggering of an upshift to the next gear step. If the driver now decides because of the driving situation that an upshift to the next gear step up is required, he simply actuates the kick-down switch briefly and the upshift is triggered.

Starting from the current driving situation, when a downshift is permissible, i.e., when there is no risk of unacceptably high drive engine speeds, the kick-down switch has its normal function.

In the simplest case, the engine speed ranges in which a downshift or an upshift is triggered due to actuation of the kick-down switch, are immediately adjacent to one another. However, greater safety against undesired upshifts or downshifts is obtained if the first boundary speed, below which a downshift is triggered when the kick-down switch is actuated, is lower than the second boundary speed, which is the lower of the engine speed ranges in which an upshift is triggered by actuating the kick-down switch.

It is advantageous to provide a visual display and/or acoustic signal which indicates to the driver whether the engine speed is above or below the second boundary speed.

When the kick-down switch is actuated by the driver for the purpose of an upshift, as a rule no high acceleration values should be produced since, for a short time, operation is under full load. For that reason, in an advantageous embodiment of the invention, an upshift will only be triggered by actuation of the kick-down switch starting from the second- and third-highest gear steps. In all other gear steps this function is inactive.

Advantageously, an upshift is triggered when the signal of the kick-down switch comprises a ramp that occurs when the switch changes from a condition in which it is not actuated to a condition in which it is actuated.

BRIEF DESCRIPTION OF THE DRAWINGS

The invention will now be described, by way of example, with reference to the accompanying drawings in which.

DETAILED DESCRIPTION OF THE INVENTION

Figure 1:
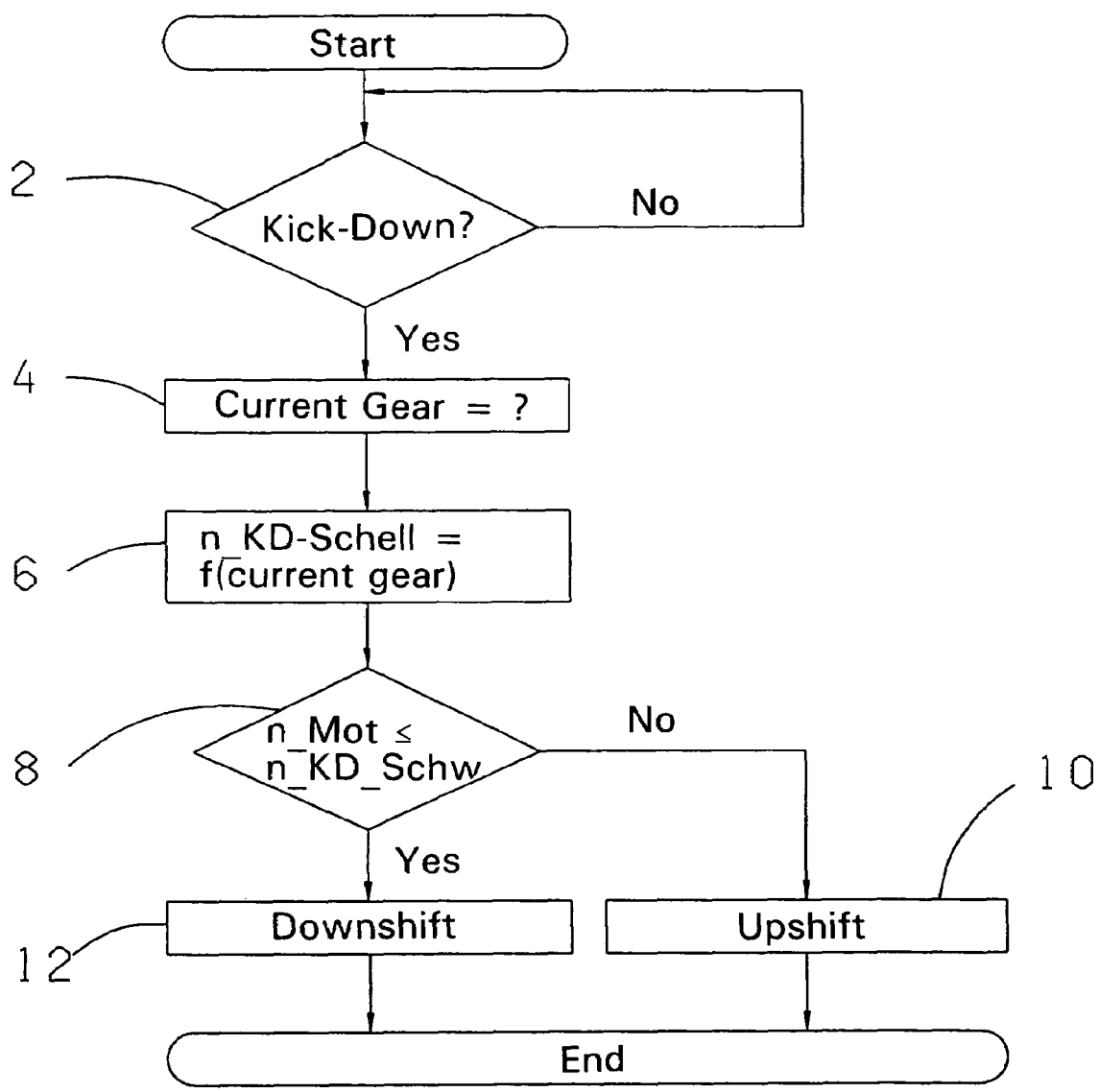
FIG. 1 is a program sequence diagram.

Shown in FIG. 1 is a program sequence which continually repeats during the operation of the vehicle. In block 2, it is tested whether the kick-down switch is emitting a kick-down signal.

A corresponding program is stored in an electronic transmission control unit.

If it is detected in block 2 that there is a kick-down demand, the gear step engaged is determined in block 4. The boundary speed, above which an upshift is triggered as a result of actuating the kick-down switch, is determined in block 6 as a function of the gear step engaged. In block 8, it is determined whether the actual engine speed n_Mot is lower than or equal to a second boundary engine speed n_KD_Schw determined. If this is not the case, so that the second boundary speed has been exceeded, then an upshift takes place in block 10. In the example shown in FIG. 1, the first boundary speed, below which a downshift is triggered as a result of actuating the kick-down switch, is equal to the second boundary speed. Thus, if it is found in block 8 that the engine speed is lower than the second boundary speed, a downshift takes place in block 12.

Figure 2:
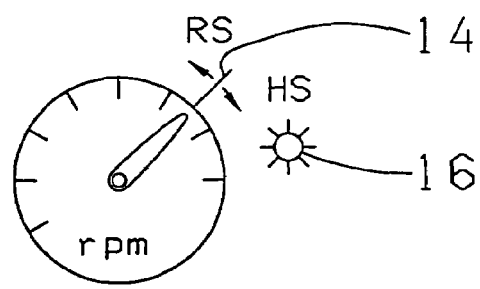
FIG. 2 is an engine speed sensor with a visual display.

In FIG. 2 the second boundary speed n_KD_Schw is indexed 14 on an engine speedometer. Above this limit, actuation of a kick-down switch results in an upshift HS and below it actuation of the kick-down switch results in a downshift RS. An indicator light 16 lights up when the second boundary speed has been exceeded, so that the driver can see at a glance what will happen when he actuates the kick-down switch.

Figure 3:
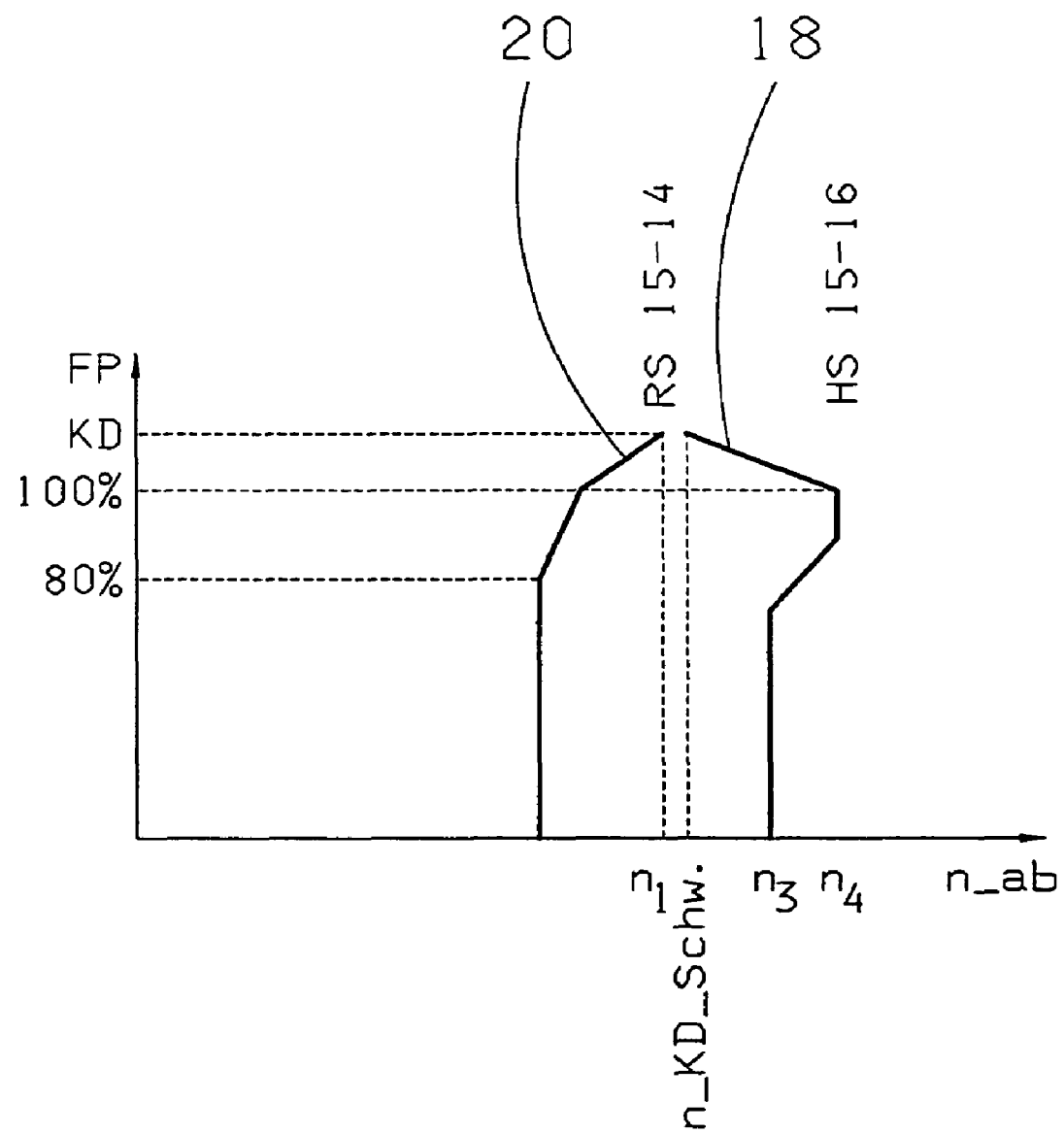
FIG. 3 is a section of a switching program according to the invention.

FIG. 3 shows a section of a shift program, in which an upshift line HS 15-16 for shifting from gear step 15 to gear step 16 and a downshift line RS 15-14 for shifting from gear step 15 to gear step 14 are shown. In this, accelerator pedal positions corresponding to the load situation from 0 to 100% and the accelerator pedal position when the kick-down switch is actuated, are plotted against the drive output speed n_ab of the transmission. The value $n_1$ denotes a first boundary speed, below which actuation of the kick-down switch triggers a downshift. The second boundary speed n_KD_Schw is somewhat above the first boundary speed $n_1$, so that an unforeseen shift can largely be excluded. At transmission output speeds between the second boundary speed n_KD_Schw and the speed $n_3$, no upshift to gear step 16 takes place if the kick-down switch is not actuated. The shift line for the upshift HS 15-16 from gear step 15 to gear step 16 corresponds, at high loads, to a high speed value $n_4$, which reaches the nominal maximum speed of the drive engine. The upshift line HS 15-16 thus corresponds to a third boundary speed, above which an upshift to the next gear step up takes place, the values of this upshift line being determined as a function of the load. In this the speed $n_3$ is chosen such that about 90% of the nominal maximum drive engine speed is reached before an upshift to gear step 16 takes place. If now, due to actuation of the kick-down switch, the part of the upshift line HS 15-16 indexed as 18 is exceeded, an upshift to gear step 16 takes place, whereas as a result of exceeding the part of the downshift line RS 15-14 indexed as 20, a downshift to gear step 14 takes place.

REFERENCE NUMERALS

2–12 Program block
14 Boundary speed
16 Light
18 Line section
20 Line section

The invention claimed is:

1. A method for controlling an automatic gearshift stepped variable speed transmission of a motor vehicle having several gear steps, the transmission being driven by a drive engine in which load indications by a driver are detected from an accelerator pedal and, depending on an accelerator pedal position and one of an engine and a transmission speed, one of an upshift and a downshift between the gear steps is triggered automatically, and a kick-down switch being present which is actuated when the accelerator pedal is fully depressed, the method comprising the steps of:

for a first engine speed range below a first boundary speed ($n_1$) of one of an engine and a transmission, actuating the kick-down switch triggers a downshift, and for one or more higher gear steps above a second boundary speed (n_KD_Schw), even at high loads, actuating the kick-down switch triggers only an upshift.

2. The method according to claim 1, further comprising the step of locating first and second speed ranges directly adjacent to one another.

3. The method according to claim 1, further comprising the step of limiting an upper level of a second speed range by a third boundary speed (HS 15-16), above which an upshift to a next gear step up takes place.

4. The method according to claim 3, further comprising the step of determining values of the third boundary speed (HS 15-16) as a function of the load.

5. The method according to claim 3, further comprising the step of making values of the third boundary speed (HS 15-16) sufficiently high so that when the boundary speed is exceeded, at least about 90% of a nominal maximum speed of the drive engine is reached.

6. The method according to claim 1, further comprising the step of only triggering an upshift, by actuation of the kick-down switch, for a second- and a third-highest gear step.

7. The method according claim 1, further comprising the step of providing at least one of an indicator light or an acoustic signal (16) which indicates to the driver whether or not the second boundary speed (n_KD_Schw) is exceeded.

8. The method according to claim 1, further comprising the step of triggering of a gearshift as a result of a ramp of a signal produced by the kick-down switch, in which the ramp occurs when the kick-down switch changes from a condition in which the kick-down is not actuated to a condition in which the kick-down is actuated.

9. A method for controlling an automatic gearshift stepped variable speed transmission of a motor vehicle having several gear steps, the transmission being driven by a drive engine in which a load Indication by a driver is detected from an accelerator pedal and, depending on a position of the accelerator pedal and one of an engine and a transmission speed, one of an upshift and a downshift is triggered automatically between the gear steps by actuation of a kick-down switch, and the kick-down switch being actuated when the accelerator pedal is fully depressed, the method comprising the steps of:

actuating the kick-down switch, for a first engine speed range below a first boundary speed ($n_1$) of one of an engine and a transmission, triggers a downshift; and actuating the kick-down switch, for one or more higher gear steps above a second boundary speed (n_KD_Schw), triggers an upshift.

* * * * *